United States Patent
Lahiri et al.

(10) Patent No.: US 12,321,353 B2
(45) Date of Patent: Jun. 3, 2025

(54) EXTENDING DATABASE DATA WITH INTENDED USAGE INFORMATION

(71) Applicant: Oracle International Corporation, Redwood Shores, CA (US)

(72) Inventors: Tirthankar Lahiri, Palo Alto, CA (US); Juan R. Loaiza, Woodside, CA (US); Beda Christoph Hammerschmidt, Palo Alto, CA (US); Andrew Witkowski, Foster City, CA (US); Sankar Subramanian, Cupertino, CA (US); Sabina Petride, Tracy, CA (US); Ajit Mylavarapu, Mountain View, CA (US); Gerald Venzl, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/099,034

(22) Filed: Jan. 19, 2023

(65) Prior Publication Data

US 2024/0126763 A1    Apr. 18, 2024

Related U.S. Application Data

(60) Provisional application No. 63/416,052, filed on Oct. 14, 2022.

(51) Int. Cl.
*G06F 16/28* (2019.01)
*G06F 16/22* (2019.01)
*G06F 16/2455* (2019.01)

(52) U.S. Cl.
CPC ...... *G06F 16/24565* (2019.01); *G06F 16/221* (2019.01); *G06F 16/24554* (2019.01)

(58) Field of Classification Search
CPC ............ G06F 16/24565; G06F 16/221; G06F 16/24554
See application file for complete search history.

(56) References Cited

U.S. PATENT DOCUMENTS

| | | | | |
|---|---|---|---|---|
| 7,809,763 | B2 * | 10/2010 | Nori ...................... | G06F 16/213 707/802 |
| 8,484,208 | B1 * | 7/2013 | Raghavan ............ | G06F 16/248 707/728 |

(Continued)

FOREIGN PATENT DOCUMENTS

WO    WO2013184523 A1 *  12/2013

OTHER PUBLICATIONS

Degener et al., "Optimizing Schema-Last Tuple-Store Queries in Graphd". ACM 2010.*

(Continued)

*Primary Examiner* — Daniel A Kuddus
(74) *Attorney, Agent, or Firm* — Hickman Becker Bingham Ledesma LLP (57) ABSTRACT

Disclosed herein are techniques for storing, within a database system, metadata that indicates an intended usage (IU). Once created, an IU may be assigned to a column to (a) indicate how the column is intended to be used, and (b) affect how the database server behaves when database operations involve values from the column. The IU assigned to a column supplements, but does not replace, the datatype definition for the column. Each IU may have an IU-bundle. The IU-bundle of an IU indicates how the database server behaves with respect to any column that is assigned the IU. For example, the IU-bundle may indicate constraints that the database server must validate during operations on values (Continued)

from columns assigned to the IU. Techniques are also described for implementing multi-column IUs and flexible IUs.

19 Claims, 2 Drawing Sheets

(56) References Cited

U.S. PATENT DOCUMENTS

| | | | | |
|---|---|---|---|---|
| 8,772,159 B2* | 7/2014 | Tseng | ............... | H01L 21/28518 |
| | | | | 438/655 |
| 9,171,065 B2* | 10/2015 | Raghavan | ........... | G06F 16/9024 |
| 10,366,083 B2* | 7/2019 | Chavan | ............... | G06F 16/2453 |
| 11,055,289 B2* | 7/2021 | Bastawala | ............ | G06F 16/221 |
| 11,269,874 B2* | 3/2022 | Fender | ............. | G06F 16/24542 |
| 2009/0292711 A1* | 11/2009 | Konik | ............... | G06F 16/24565 |
| 2010/0174692 A1* | 7/2010 | Meyer | ................... | G06F 16/972 |
| | | | | 707/774 |
| 2014/0081907 A1* | 3/2014 | Tran | ...................... | G06F 16/219 |
| | | | | 707/E17.005 |
| 2014/0250060 A1* | 9/2014 | Zhang | ................. | G06F 16/2343 |
| | | | | 707/609 |
| 2015/0074686 A1* | 3/2015 | Baeuerle | ................ | G06F 11/36 |
| | | | | 719/318 |
| 2018/0107343 A1* | 4/2018 | Mills | ........................ | G06F 8/35 |
| 2021/0081389 A1* | 3/2021 | Liu | ................... | G06F 16/24552 |
| 2021/0294795 A1* | 9/2021 | Fender | ............. | G06F 16/24542 |

OTHER PUBLICATIONS

Marino, Lisa et al., Oracle Fusion Applications Developer's Guide Release 12, Ch. 22-23, Jan. 2017, XP093095536, https://docs.oracle.com/applications/falcm12/OADEE/OADEE.pd, 125pgs.

Current Claims, in International Application No. PCT/US2023/027578, dated Jul. 13, 2023, 4 pages.

* cited by examiner

EXTENDING DATABASE DATA WITH INTENDED USAGE INFORMATION

This application claims the benefit under 35 U.S.C. § 119(e) of provisional application 63/416,052, filed Oct. 14, 2022, by Tirthankar Lahiri et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE INVENTION

The present disclosure relates to database systems and, more specifically, to the ability for the database server to maintain and use metadata regarding intended use of data in a column.

BACKGROUND

Database systems maintain certain types of information about the tables they manage. Such information typically includes information about the datatype of values that are stored in each column of each table. For example, table "emp" may have a column "Firstname" of the data type "string" (or VARCHAR2, CHAR, NCHAR, NVARCHAR2, CLOB, or NCLOB), and a second column "SSN" of the datatype integer.

Based on the name of the Firstname column, a human may infer that the intended use of the Firstname column is to store strings that are the first names of employees. Similarly, a human may infer that the intended use of the "SSN" column is to store integers that are the social security numbers of employees. However, from the perspective of the database server, the values in the Firstname column are merely strings with no particular intended usage, and are therefore treated the same as values in any other column that stores strings. Similarly, to the database server, the SSN column stores integers with no particular intended usage, and are therefore treated the same as values in any other column that stores integers.

In many situations, values from one column of a given datatype need to be treated differently than other columns of that same datatype. However, since the intended usage of the values in the columns is unknown to the database server, the database application logic must be responsible for implementing the logic for handing columns, of the same datatype, differently based on the intended usage of those columns.

Unfortunately, the datatype of a column conveys very little information about the intended use of the column. For example, knowing the datatype of the column tells the database server nothing about whether the column is used to store: email addresses, names, passwords, urls, phone numbers, credit card numbers, social security numbers, user ids, percentages, IP addresses, ages, birthdates, etc. The database does not know the difference between any of these, since the underlying data are stored as primitive types such as NUMBER or VARCHAR or CLOB.

Currently, usage information is typically only informally documented or stored within tools. Lack of centralized standards for documenting intended usage fragments semantics by tool and often leads to inconsistencies.

One approach that allows users to ensure that the values of a column will receive special treatment is to create a user-defined data type or SQL domain that corresponds to the intended usage. SQL domains are data types with optional constraints. Information on SQL domains may be found at www.webeanswers.com/what-is-a-domain-in-sql. Once such a user-defined data type or SQL domain has been defined, the user-defined data type/domain can be declared to be the datatype of the column in question. For example, a user may create a "phone_number" user-defined datatype or domain, and declare column "phone" to be of that user-defined datatype or domain. While this does allow values in the "phone" column to be treated differently than integers, it has several disadvantages. For example, once declared to be of type/domain "phone number", operations that may be performed on values in such a "phone" column are limited to those that have been defined for the user-defined data type/domain "phone_number". From the perspective of the database server, the values stored in such a phone column do not have the primitive type of NUMBER, and therefore cannot be manipulated as such. Another disadvantage of the user-defined data type/domain approach is the burden that it places on the programmer to define user-defined data types and domains, which can be difficult, error prone, and time consuming.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Disclosed herein are techniques for providing a simple light-weight way for developers to indicate that a column has a particular intended usage (e.g. stores a phone number or URL) without breaking an existing application that uses the column. The intended usage of a column or set of column shall be referred to herein as the "IU" of the column or set of columns. According to one implementation, each IU is associated with an "Intended-Usage Label" (or "IU-label"). The IU of a column (or set of columns) is stored as metadata in addition to, not instead of, the metadata that indicates the underlying primitive datatypes of the column(s). Thus, the IU of a column supplements, but does not replace, the datatype definition for a column.

For example, a column of primitive datatype NUMBER that has an IU of "phone_number" is still treated by the database server as a NUMBER, and therefore can be referenced and manipulated by any function that operates on NUMBERs. However, if any database tool or application sends a DESCRIBE request that targets a table with one or more columns associated with an IU, the database server returns not only information about the names and primitive datatypes of the columns, but also information about the IUs that are associated with the columns.

Because IUs are stored centrally in the database as metadata associated with the particular column(s) in question, the usage information may be utilized by database tools without requiring each tool to separately maintain intended usage information. Further, the complexity of creating user-defined datatypes and/or domains is avoided.

According to implementations described hereafter, each IU has a corresponding "IU-bundle". An IU-bundle specifies an IU-Label. In addition to the IU-Label, the IU-bundler of an IU may store additional information about the values in columns that are assigned the IU. For example, in addition to an IU-Label, IU-bundles may include:
- constraints
- default values
- sort strategy
- display format
- options for the columns that are assigned the IU. According to some implementations, the IU-Label is the only mandatory element of an IU-bundle. Other elements, such as constraints and default values, are optional.

The additional information specified in an IU-bundle may affect behavior of the database server. For example, if a column X is associated with the IU "age", and the IU "age" has an IU-bundle that specifies a constraint that constrains age values to the range 0-150, then the database server may raise an error if an attempt is made to store the value 998 into column X.

As another example, if a column Y is associated with the IU "salary", and the IU "salary" has an IU-bundle that specifies a display format that begins with "$", then the database server may automatically format values that are retrieved from column Y so that they begin with "$".

In addition to user-defined IU-bundles, some IU-bundles may be built-in to the database server to cover common use cases. For example, according to one implementation, the database system may provide built-in IU-bundles for common usages of numerical datatypes:
- Percent, Temperature, Phone Number, Currency, Credit Card, SS # as well as built-in IU-bundles for common usages of string datatypes:
- Email, US State, Country Name or Code, First Name, Last Name, etc.

Since usage is easy to specify, it will be much easier to expand this set of built-in usages compared to database developers expanding on the set of built-in datatypes.

Declaring and Assigning an IU

According to one implementation, an IU may be created by a CREATE statement such as:
  CREATE IU Temperature AS NUMBER . . . .

In receiving this CREATE statement, the database server creates the IU "Temperature" and stores metadata for the IU in the database server. The metadata indicates, among other things, that the IU-Label for the IU is "Temperature". The "AS NUMBER" statement indicates that that any column with the primitive type NUMBER may be associated with the IU Temperature. Attempts to assign the IU Temperature to any column that does not store the primitive datatype NUMBER will result in an error.

Once an IU-bundle has been created, the IU may then be assigned to any column that has a primitive datatype that matches any of the primitive datatypes listed in the IU definition. For example, the following statement may create a table "Readings" with a column "value" that has the datatype NUMBER and is associated with the IU Temperature:
  CREATE TABLE Readings(Value NUMBER IU Temperature)

In one implementation, the ALTER TABLE command may also be used to associate an IU with a column after the table containing that column has been created. The following statement is an example of such a command:
  ALTER TABLE Readings MODIFY COLUMN Value IU Temperature;

IUs may also be associated with virtual columns, as in the following example:
  CREATE TABLE Sales(ID NUMBER,
    Price NUMBER IU Currency,
    Discount NUMBER IU Percent,
    NetPrice AS(PRICE*(1−DISCOUNT))IU Currency);

In this example, a DESCRIBE of table Sales will indicate that the virtual column "NetPrice" is associated with the IU "Currency". The constraint may be "enabled" to cause the constraint to be enforced by the database server. If a constraint of the Currency IU is enabled for database-level enforcement, then the constraint is checked when values of the constituent columns ("Price" and "Discount") in the virtual column expression are modified.

It should be noted that the keyword "IU" is merely one example of a keyword that may be used to create and reference IUs. The techniques described herein may be implemented with any keywords that are considered useful. For example, the keyword DOMAIN may be used to create and assign IUs. However, even in implementations that use the keyword DOMAIN, the IU differs from conventional domains in that the IU supplements but does not replace the underlying datatype of the column in question. An implementation that uses the keyword DOMAIN to create and assign IUs may, for example, support the following statements:
  CREATE DOMAIN Temperature AS NUMBER . . . .
  CREATE TABLE Readings(Value NUMBER DOMAIN Temperature)

IU-Bundles Overview

As mentioned above, in addition to an IU-Label, an IU-bundle may specify various types of information about the IU. The information specified in the IU-bundle may affect how the database server behaves relative to values that belong to column(s) to which the IU-bundle is assigned. According to one implementation, an IU-bundle may specify:
- IU-Label: Such as Percent, Email, LastName, FirstName, etc.
- Collation (rules that determine how data is stored), Default Value
- Constraint(s): to restrict the data to values/formats allowed by the usage
- Display Expression (metadata about how data are to be displayed): To render the data as a string, like a IU specific to_char( )
- Ordering Expression: To allow IU values to be ordered by IU semantics, such as days in a week, instead of alphabetical or numerical order
- Optional Additional Metadata: that can be used to further influence application behavior (e.g. non-default label, IsSensitive, Input/Output Masking, etc.)

In one implementation, the syntax for statements that create IU-bundles is:
   CREATE IU IU-Label AS Type1 [OR Type2 OR Type3 OR . . . TypeN]
   DEFAULT expression COLLATE collation
   {CONSTRAINT Name [CHECK condition NOT NULL NULL] [DISABLE]}*
   [DISPLAY<SQL Expression>]
   [ORD<SQL Expression>]
   [OPTIONS<Free form Property-Value>]

In this example statement, IU-Label is the name of IU. Preferably, the IU-Label should not be an existing type name. The "AS" clause specifies the primitive datatype(s) to which the IU may be applied (e.g. NUMBER, VARCHAR2, etc.) The "OR" clause is used, as explained hereafter, when an IUs can apply to additional compatible datatypes (e.g. CLOB and VARCHAR2), or NUMBER and BINARY_FLOAT.

The CONSTRAINT clause may be used to specify one or more IU constraints, and whether the constraints are enabled or disabled. Disabled constraints document usage without runtime overhead. Tools can use them to perform validation as data is entered.

The "DISPLAY expr" clause allows the specification of a SQL expression to convert the IU value into a varchar for display uses. The display expression may indicate, for example, that for a given numerical IU, the values should be shown in a format that includes a decimal point with two digits following the decimal point.

The "ORD expr" clause may be used to specify a deterministic SQL expression converting the IU value into an orderable value. For example, if the IU is for days of the week, it may be desirable for the values to be ordered in the sequence of occurrence (e.g. Monday, Tuesday, Wednesday, etc.) rather than alphabetically (e.g. Friday, Monday, Thursday, etc.).

The OPTIONS section may be used to specify optional attributes e.g format, security rules (encrypt, redact, etc.) According to one embodiment, the options may be specified as a series of property-value pairs. The metadata in the OPTIONS section may be interpreted by and affect the behavior of (a) client-side validation tools, (b) the database server, (c) both the client-side validation tools and the database server, or (d) neither the client-side validation tools nor the database server. In the latter case, the metadata may merely be informational, similar to inline annotations. Examples of metadata that may be specified in the OPTIONS sections include:
   MIN/MAX
   REGEXP
   LIST OF VALUES
   REFERENCE TO TABLE OF LIST OF VALUES
   UPPER/LOWER(case sensitive/insensitive)
   PRECISION/SCALE The OPTIONS section may also be used, for example, to specify which operations are allowed on columns to which the IU has been assigned. For example, the OPTIONS section may indicate whether GROUP BY or SORT operations may be performed on the column.

One-to-Many Relationships Between Primitive Types

As mentioned above, the "AS" portion of an IU bundle specifies one or more primitive types to which the IU bundle may be applied. However, in many cases, it may be desirable for the same IU to be useable with numerous primitive datatypes. For example, assume that a table T is being created with a column X whose intending usage is to store credit card numbers. To indicate this intended usage of column X, the IU "credit card" may be associated with column X.

However, if column X is of type NUMBER, an error would occur if the IU "credit card" is limited to the primitive datatype STRING. Similarly, if column X is of type STRING, an error would occur if the IU "credit card" is limited to the primitive datatype NUMBER. Therefore, according to an embodiment, the IU "credit card" may be defined as being usable with both NUMBERs and STRINGs. By allowing one-to-many relationships between IUs and primitive datatypes, the creator of table T is able to independently decide how to internally represent credit card numbers while still being able to take advantage of the IU-bundle that has been defined for credit cards.

Multi-Column IUs

In the examples given above, an IU-bundle is assigned to a single column. However, in some situations, it may be desirable to treat a collection of columns as a single unit for the purposes of IU-bundle assignments. For example, an address may include a street address, an apartment number, a city, a state, and a zip code. Each of these attributes may be stored in separate columns, none of which qualifies as a complete address. However, when considered collectively, the usage intent of that set of columns is to store addresses. To handle such situations, implementations include a mechanism for declaring multi-column IUs and IU-bundles.

The following are examples of how multi-column IUs may be declared, according to one implementation. A US city comprises a city name, state and zip code. Thus, an IU-bundle for the IU "US city" may be defined as follows:
   CREATE IU US_City(name AS VARCHAR2 OR CLOB,
      state AS VARCHAR2 OR CHAR(2),
      zip AS NUMBER OR VARCHAR2)
   CONSTRAINT City_CK CHECK(<function to check for valid combination>)
   PROPERTIES{DISPLAY_DEFAULT:sql_expr
      ("name ||","|| state||","|| TO_CHAR(zip))};

In the above-example, the DISPLAY_DEFAULT indicates how data associated with the IU US_City should be displayed by default. In this specific example, the city name is followed by a comma, followed by the state name followed by a comma, followed by the zip (which is converted from the internal zip format into a character string). Once a multi-column IU has been defined, the multi-column IU can now be applied to a multi-column group, as in the following example:
   CREATE TABLE Customer(Id NUMBER, CustName VARCHAR2,
      CustCity VARCHAR2,
      CustState VARCHAR2,
      CustZip NUMBER,
      IU US_City(CustCity, CustState, CustZip));

In one implementation, the database server supports dynamically adding or dropping IU associations after the table has been created. According to one embodiment, this may be accomplished for multi-column IUs by dynamically enabling/disabling them using commands such as:
   ALTER TABLE Customer ADD IU US_City(CustCity, CustState, CustZip)) [VALIDATE NOVALIDATE];
      (enforce/no-enforce)
   ALTER TABLE Customer DELETE IU US_City (CustCity, CustState, CustZip);

The contents of an IU-bundle that is assigned to a particular set of columns affects how the database server behaves during operations involving those columns in the same way as has been described for single-column IU-bundles. For example, in response to operations that change values in any of the columns involved in the IU, the database server may check that those changes do not violate any constraints defined in the multi-column IU-bundle. In addition, the multi-column IU-bundle may affect the display, sorting, etc. of values from columns associated with the IU bundle, as described above. Multi-column IUs may include, for example, constraints that involve two or more of the columns. Thus, a multi-column JOB IU may include a column for storing a start date and a column for storing an end date, and define a constraint that the end date cannot be before the start date.

IU-Bundles for Query Results and Views

In the preceding discussions, it was explained that IU-bundles may be associated with columns, virtual columns and even sets of columns of tables. However, in one implementation, IU-bundles may be associated with any sets of values maintained in or returned by the database, including query results and views.

With respect to views, in one implementation, a view column that corresponds to an underlying table column is treated by the database server as being associated with any IU-bundle with which the underlying table column is associated. A projected (untransformed) value preserves the column's intended usage, as in the following example:
   CREATE VIEW C500_READINGS AS
   SELECT temp C500 FROM Readings WHERE ID=500;
   =>C500 should retain the intended usage of Temperature
As another example:
   =>"create table as select Temp" will preserve the appropriate IU-bundle association in the destination table.

In one implementation, an IU is not automatically preserved in expression evaluations, but can be associated with a view column or a column of a query result (using IU CAST) as illustrated in the following example:
   CREATE VIEW Contact(ID, cust_info) AS
      SELECT CAST(cust_info AS [IU] Email VALIDATE)
         FROM<SubQuery>)
            => The metadata for cust_info will have the IU of email In one embodiment, a CAST revalidates any IU constraint if requested (or if constraint is enabled). That is, execution of the view retrieves the data from the underlying table and checks the data thus retrieved against the constraints that are defined in the IU (e.g. Email) to which the data is being cast. In one implementation, the "IU" keyword is optional.

In one implementation, an aggregation will only preserve the IU associates when explicitly requested, as in the following example:
   SELECT CAST(avg(temp) AS [IU] Temperature), AvgTemp from Readings;

In one implementation, an IU-bundle assignment is preserved in a result set, only if it is known via static type inferencing that all possible elements of the result set will have that IU. For example:
   UNION/INTERSECT [ALL]: Preserves IU if both operands have same IU
   MINUS [ALL]: Preserves IU only of the first operand
   CASE/DECODE/NVL: Preserves IU if all operands have same IU

EXAMPLES

SELECT Score FROM Grades2020 [UNION|INTERSECT] SELECT Score FROM Grades2021:
In this example, the "Score" column in the result has IU Percent only if the Score column has IU Percent in both the Grades2020 and Grades2021 tables.

SELECT Score FROM Grades2020 MINUS SELECT Score FROM Grades2021:
In this example, "Score" has the IU Percent if the Score column only if the Grades2020 table has a IU of Percent (since only that table contributes rows to the result).
   NVL(score1, score2)
In this example, the result has IU Percent if both score1, score2 have the IU Percent.

According to one implementation, the database server treats values that are CAST to a particular IU-bundle in the same manner as values from columns that are defined as having that particular IU-bundle. For example, in response to a column referenced in a SELECT statement being cast as the IU Temperature, the database server may raise an error if values in that result set violate any constraints specified for Temperature. In addition, other aspects of those values, such as the display and sort order, may also be affected by the information in the IU-bundle for Temperature.

According to one implementation, multi-column IUs may also be specified for query results and views. For example, the US city IU may be assigned to columns of a view as follows:
   CREATE VIEW CustCity(Id, City, State, Zip) AS
      SELECT CustId, CAST((CustCity, CustState, CustZip)
         AS IU US_City) FROM Customer;
This IU is now visible from a DESCRIBE of the view, and once again the text of the constraint, properties, etc. are available to applications.

IU-Bundles and Flex Fields

A "flex field" is a "spare" column that may be used as needed by database applications. Often, the use of flex fields will vary from row to row, based on the value(s) in one or more other (discriminant) columns. For example, assume that a table is used to store information about expenses. The table may include a column "EXPENSE_TYPE" for indicating a type of expense, and several spare columns (ATTR_1, ATTR_2, ATTR_3, ATTR_NUMBER_1) for storing information about the expenses. The use of those spare columns for each row may hinge on whether the EXPENSE_TYPE column for the row has the value "Flight", "Meals", or "Lodging", as follows:
   Flight: ATTR_1 Is Flight No, ATTR_2 is Origin, ATTR_3 is Destination, all other spares are NULL
   Meals: ATTR_1 is Restaurant Name, ATTR_2 is Meal Type (e.g. breakfast) ATTR_NUMBER_1 is the No. of diners, all other spares are NULL
   Lodging: ATTR_1 is Hotel Name, ATTR_NUMBER_1 Is the No. of Nights, all other spares are NULL In this example, the intended usage of the ATTR_1 column varies based on the value in the EXPENSE_TYPE column. Specifically, Flight, Meals, or Lodging in the EXPENSE_TYPE column causes the ATTR_1 column to be used for flight numbers, restaurant names, and hotel names, respectively.

Figure 1:
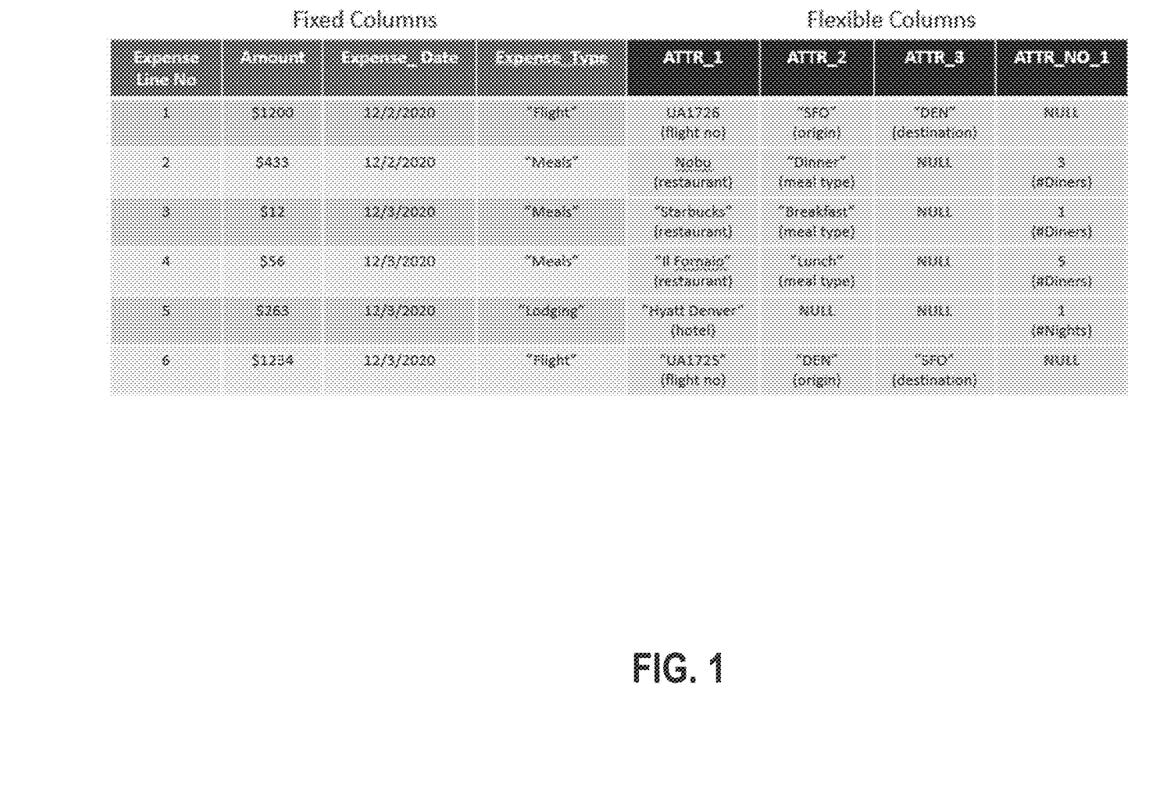
FIG. 1 is a block diagram of a table that includes a plurality of columns to which a flexible IU may be assigned.

Referring to FIG. 1, it is a block diagram illustrating a populated table that makes use of flex fields.

According to one embodiment, the database server supports "Flexible IUs" that may be used in conjunction with flex fields. The metadata for a Flexible IU includes:
   metadata that identifies a set of candidate IUs, and
   a function that returns the IU, from the set of candidate IUs, that belongs to a given row The function that returns the IU for a given row is referred to herein as the IU-choosing function of the flexible IU. When the database server is performing an operation that involves a column that has been assigned to a flexible IU, the database server executes the IU-choosing function of the flexible IU on each row affected by the operation to determine which IU corresponds to that row. Once the proper IU is identified for a given row, the database server behaves according to the contents of the IU bundle of the chosen IU (e.g. validates constraints, etc.).

A flexible IU assigns a specific (multi-column) IU to a set of value columns based on a mapping expression composed from one or more discriminant columns. Discriminant columns are the columns whose values, for a given row, determine the IU that applies to the given row. The format for specifying a flexible IU may be as follows:

CREATE FLEXIBLE IU FlexIUName(val1, val2, . . . valN)
[CHOOSE [IU]] USING(disc1, disc2, . . . discM) IN<Expression Returning a single IU>

In this example, val1, . . . valN and disc1 . . . discM are formal parameters that are replaced with column names as actual parameters when the IU is applied to a table.

Discriminant columns may be separate or overlap with value columns, e.g. exp_type may be one of the value columns covered by the expense_details conditional IU. If the IU consists of a single json column, it is possible for the discriminant to be either one or more separate columns, or one or more fields within the json. For example, if all the flexfields for expenses are stored in a single details json column, it is also possible for the discriminant to be details.exp_type An example of a statement for creating a flex IU for the expense information illustrated in FIG. 1 is:

CREATE FLEXIBLE IU Expense_Details(val1, val2, val3, val4) CHOOSE IU USING(typ_col)
IN DECODE(typ_col, 'Flight', Flight_Details, 'Meals', Meals_Details, 'Lodging', Lodging_Details)

The flexible IU thus defined can be applied to the Expenses table using column names as arguments (attr1, attr2, attr3, attr4 are the flex field columns) as follows:

ALTER TABLE EXPENSES ADD IU Expense_Details (attr1, attr2, attr3, attr4) CHOOSE IU USING (exp_type)

In an alternative embodiment, the IU-choosing function of a flexible IU may make use of a mapping table. For example, such a table may include an Exp_Type column and an IU column. In the present example, one row of the mapping table would include "Flight" in the Exp_Type column and "Flight Detail" in the IU column. Another row would include "Lodging" in the Exp_Type column and "Lodging Detail" in the IU column. Another row would include "Meals" in the Exp_Type column and "Meals_Detail" in the IU column. When it is necessary for the database server to choose an IU for a particular row in the Expense table, the database server would perform a lookup in the mapping table to determine the IU that applies to the row.

In yet another embodiment, an IU-chooser query may include logic for performing the IU-chooser function. For example, assume that there is an IU for low expense amounts, and another IU for higher expense amounts. A query to choose between the two may be:

CREATE FLEXIBLE IU Expense_Details(val1, val2, val3, val4)
CHOOSE IU USING(typ, amt) IN
SELECT IU from Expense_IUs where
Exp_type=:typ and:amt>=exp_min and:amt<exp_max The most general approach to an IU-choosing function is to use a mapping function if the logic for mapping discriminant columns to domains is too complex to express via a query. Such may be true, for example, when an expense IU may depend on the expense type, amount, division, employee job code, as well as expense date, etc.

An Expense_IU PL/SQL package could be constructed to encapsulate the mapping logic, with an expense_IU_map( ) function. In such a situation, the flexible IU may be defined as follows:

CREATE FLEXIBLE IU Expense_Details(val1, val2, val3, val4)
CHOOSE IU USING(typ, amt, dept, jobcode, dat) IN Expense_IU_Pkg.Expense_Domain_Map(typ, amt, dept, jobcode, dat)

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
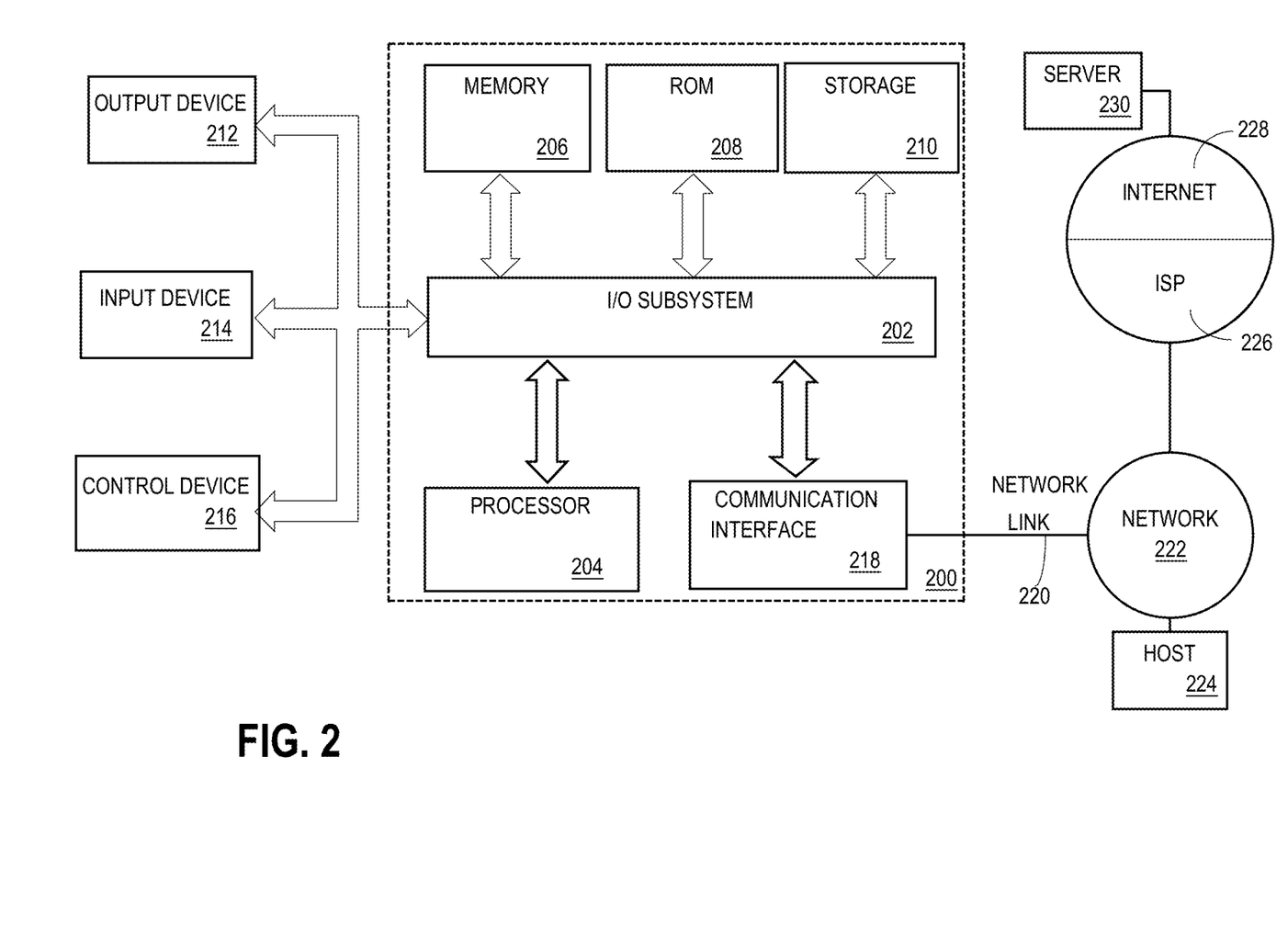
FIG. 2 is a block diagram of a computer system upon which embodiments of the invention may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   in response to input received by a database server, the database server storing, in a database that is managed by the database server:
      metadata that:
         defines a flexible Intended-Usage (IU) comprising a plurality of candidate IU-bundles, and
         specifies assignment, of a candidate IU-bundle of said plurality of candidate IU-bundles to a column of a table for a particular row of said table, based on one or more other columns of said table;
   responsive to determining that a first candidate IU-bundle of said plurality of candidate IU-bundles is assigned to a first row of said table, the database server:
      providing to database applications information specified in the first candidate IU-bundle regarding intended usage of the column, and
      enforcing a constraint specified in the first candidate IU-bundle relative to values inserted into said first row; and
   responsive to determining that a second candidate IU-bundle of said plurality of candidate IU-bundles is assigned to a second row of said table, the database server:
      providing to the database applications information specified in the second candidate IU-bundle regarding intended usage of the column, and enforcing a constraint specified in the second candidate IU-bundle relative to values inserted into the second row;

wherein the method is performed by one or more computing devices.

2. The method of claim 1, wherein:
the first candidate IU-bundle includes an IU-label, and
the database server providing the IU-label to the database applications in response to requests, from the database applications, to explain the table.

3. The method of claim 1, wherein:
the first candidate IU-bundle includes an IU-specific set of property-value pairs, and
the database server providing the IU-specific set of property-value pairs to the database applications in response to requests, from the database applications, for information regarding intended usage of the column.

4. The method of claim 1, wherein the first candidate IU-bundle specifies information that affects how the database server behaves in response to database commands that involve the column.

5. The method of claim 4, wherein the database server raises an error when any operation involving the column would cause data in the column to violate a constraint specified in the first candidate IU-bundle.

6. The method of claim 4, wherein the first candidate IU-bundle specifies a display expression, and the database server causes values from the column to be displayed in a manner consistent with the display expression.

7. The method of claim 4, wherein the first candidate IU-bundle specifies an ordering expression, and in response to a database command that orders values from the column, the database server orders values from the column in an order that is based on the ordering expression.

8. The method of claim 4, wherein the first candidate IU-bundle specifies that one or more particular operations cannot be performed on values associated with the first candidate IU-bundle, and the database server raises an error in response to a command that requests performance of any of the one or more particular operations on a value associated with the first candidate IU-bundle.

9. The method of claim 8 wherein the one or more particular operations include SORT.

10. The method of claim 8 wherein the one or more particular operations include GROUP BY.

11. The method of claim 4, wherein the first candidate IU-bundle specifies a deterministic expression for converting values from the column into orderable values.

12. The method of claim 1, further comprising the database server receiving and storing in the database data that defines the flexible IU.

13. The method of claim 12, wherein:
the data that defines the flexible IU specifies a plurality of primitive types;
wherein the plurality of primitive types includes a primitive datatype assigned to the column; and
the database server is configured to raise an error in response to any attempt to assign the flexible IU to any column that is assigned to a primitive type that does not belong to the plurality of primitive types.

14. The method of claim 1, wherein:
the flexible IU is a single multi-column Intended-Usage (IU) bundle.

15. The method of claim 14, further comprising, responsive to database commands that involve the column, the database server behaving in a manner that is based on information specified in the multi-column IU-bundle.

16. The method of claim 15, further comprising, responsive to a database command that operates on a row that includes the column, the database server:
choosing a particular candidate IU-bundle, from the plurality of candidate IU bundles, that applies to the row; and
behaving in a manner that is based on information specified in the particular candidate IU-bundle.

17. The method of claim 16, wherein the flexible IU specifies a manner of choosing the particular candidate IU-bundle from among the plurality of candidate IU bundles, based on data contained in one or more discriminant columns of the row.

18. One or more non-transitory computer-readable media storing instructions which, when executed by one or more computing devices, cause:
in response to input received by a database server, the database server storing, in a database that is managed by the database server:
metadata that:
defines a flexible Intended-Usage (IU) comprising a plurality of candidate IU-bundles, and
specifies assignment of a candidate IU-bundle of said plurality of candidate IU-bundles to a column of a table for a particular row of said table based on one or more other columns of said table;
responsive to determining that a first candidate IU-bundle of said plurality of candidate IU-bundles is assigned to a first row of said table, the database server:
providing to database applications information specified in the first candidate IU-bundle regarding intended usage of the column, and
enforcing a constraint specified in the first candidate IU-bundle relative to values inserted into said first row; and
responsive to determining that a second candidate IU-bundle of said plurality of candidate IU-bundles is assigned to a second row of said table, the database server:
providing to database applications information specified in said second candidate IU-bundle regarding intended usage of said column, and
enforcing a constraint specified in said second candidate IU-bundle relative to values inserted into said second row.

19. The one or more non-transitory computer-readable media of claim 18 wherein:
the flexible IU is a single multi-column Intended-Usage (IU) bundle.

* * * * *

UNITED STATES PATENT AND TRADEMARK OFFICE
CERTIFICATE OF CORRECTION

PATENT NO. : 12,321,353 B2
APPLICATION NO. : 18/099034
DATED : June 3, 2025
INVENTOR(S) : Lahiri et al.

It is certified that error appears in the above-identified patent and that said Letters Patent is hereby corrected as shown below:

In the Specification

In Column 2, Line 3, delete "-sq1." and insert -- -sql. --, therefor.

In Column 2, Line 12, delete ""phone number"," and insert -- "phone_number", --, therefor.

In Column 3, Line 60, delete "that that" and insert -- that --, therefor.

In Column 5, Lines 6-7, delete "condition NOT NULL NULL]" and insert -- *condition* | NOT NULL | NULL] --, therefor.

In Column 6, Line 60, delete "[VALIDATE NOVALIDATE];" and insert -- [VALIDATE | NOVALIDATE]; --, therefor.

In Column 7, Line 38, delete "<SubQuery>)" and insert -- < SubQuery>;) --, therefor.

In Column 9, Line 46, delete ""Flight Detail"" and insert -- "Flight_Detail" --, therefor.

In Column 9, Line 48, delete ""Lodging Detail"" and insert -- "Lodging_Detail" --, therefor.

Signed and Sealed this
Twelfth Day of August, 2025

Coke Morgan Stewart
*Acting Director of the United States Patent and Trademark Office*